United States Patent
Sykes et al.

(10) Patent No.: US 11,507,052 B2
(45) Date of Patent: Nov. 22, 2022

(54) SYSTEM AND METHOD OF VOXEL BASED PARAMETRIC SPECIFICATION FOR MANUFACTURING A PART

(71) Applicant: The Boeing Company, Chicago, IL (US)

(72) Inventors: Oliver William Sykes, West Chicago, IL (US); Zachary D. Jorgensen, Huntsville, AL (US); Daniel S. ReMine, Seattle, WA (US)

(73) Assignee: The Boeing Company, Chicago, IL (US)

( * ) Notice: Subject to any disclaimer, the term of this patent is extended or adjusted under 35 U.S.C. 154(b) by 11 days.

(21) Appl. No.: 16/140,041

(22) Filed: Sep. 24, 2018

(65) Prior Publication Data

US 2020/0096967 A1 Mar. 26, 2020

(51) Int. Cl.
G05B 19/4097 (2006.01)
B64F 5/10 (2017.01)
G06F 30/15 (2020.01)

(52) U.S. Cl.
CPC ............ G05B 19/4097 (2013.01); B64F 5/10 (2017.01); G06F 30/15 (2020.01); G05B 2219/35083 (2013.01); G05B 2219/35134 (2013.01); G05B 2219/35203 (2013.01); G05B 2219/37205 (2013.01)

(58) Field of Classification Search
CPC ...... G05B 19/4097; G05B 2219/35083; G05B 2219/35134; G05B 2219/35203; B64F 5/10
See application file for complete search history.

(56) References Cited

U.S. PATENT DOCUMENTS

| | | | | |
|---|---|---|---|---|
| 10,061,300 | B1* | 8/2018 | Coffman | G05B 19/4097 |
| 2016/0350335 | A1* | 12/2016 | Rorato | G06F 16/532 |
| 2017/0212500 | A1* | 7/2017 | Dostert | G05B 19/4097 |
| 2017/0249529 | A1* | 8/2017 | Young | B33Y 50/00 |
| 2018/0046649 | A1* | 2/2018 | Dal Mutto | G06N 3/02 |
| 2018/0120813 | A1* | 5/2018 | Coffman | G06F 30/00 |
| 2019/0236489 | A1* | 8/2019 | Koudal | G06N 5/04 |

OTHER PUBLICATIONS

"AUTODESK.Help, Lock Labeled Dimensions" https://knowledge.autodesk.com/support/revit-products/learn-explore/caas/CloudHelp/cloudhelp/2016/ENU/Revit-Customize/files/GUID-B638562A-D041-419A-B356-64536C493EE9-htm.html (Year: 2017); 1 page long.*
Extended European Search Report, dated Mar. 4, 2020, regarding Application No. 19198893.0, 13 pages.
Zehtaban et al., "A framework for similarity recognition of CAD models," Journal of Computational Design and Engineering, vol. 3, Issue 3, Jul. 2016, pp. 274-285.

(Continued)

*Primary Examiner* — Kenneth M Lo
*Assistant Examiner* — Tameem D Siddiquee
(74) *Attorney, Agent, or Firm* — Yee & Associates, P.C.

(57) ABSTRACT

A method and apparatus for manufacturing a part. The part is designed using a CAD system to generate a CAD part model of the part. Features of the part are identified from the CAD part model of the part. A parametric specification of the part is generated using the features of the part. The parametric specification of the part is saved as a parametric part model. The parametric part model is used to fabricate the part.

20 Claims, 14 Drawing Sheets

(56) References Cited

OTHER PUBLICATIONS

Geomagic Design X User Guide, Nov. 2013, retrieved from https://www.engineering.pitt.edu/uploadedFiles_Content/Sub_Sites/Business/MRW/SCPI_Library/specs/geomagicdesignx2014userguide.pdf, 31 pages.
Brière-Côté et al., "Comparing 3D CAD Models: Uses, Methods, Tools and Perspectives," Computer-Aided Design and Applications, vol. 9, Aug. 2013, pp. 771-794.
European Office Action dated Oct. 7, 2021 regarding EP Application No. 19198893.0; 10 pages.
Fayyad et al., "Multi-Interval Discretization of Continuous-Valued Attributes For Classification Learning," Machine Learning, IJCAI, 1993, pp. 1022-1027.
Regli III et al., "Geometric Algorithms For Recognition Of Features From Solid Models," PhD Dissertation, University of Maryland, Dec. 4, 1995, 204 pages.
Ji et al., "Machine Interpretation Of CAD Data For Manufacturing Applications," ACM Computing Surveys, University of Arizona, Sep. 1997, vol. 24, No. 3., pp. 264-311.
Bhandarkar et al., "STEP-based Feature Extraction From STEP Geometry For Agile Manufacturing," Computer in Industry, 2000, vol. 41, pp. 3-24.
Han et al., "Manufacturing Feature Recognition From Solid Models: A Status Report," IEEE Transactions On Robotics and Automation, Dec. 2000, vol. 16, No. 6, pp. 782-796.
Podgorelec et al., "Feature Extraction and Classification From Boundary Representation," Journal of Computing and Information Technology, Nov. 2003, vol. 1., pp. 41-54.

\* cited by examiner

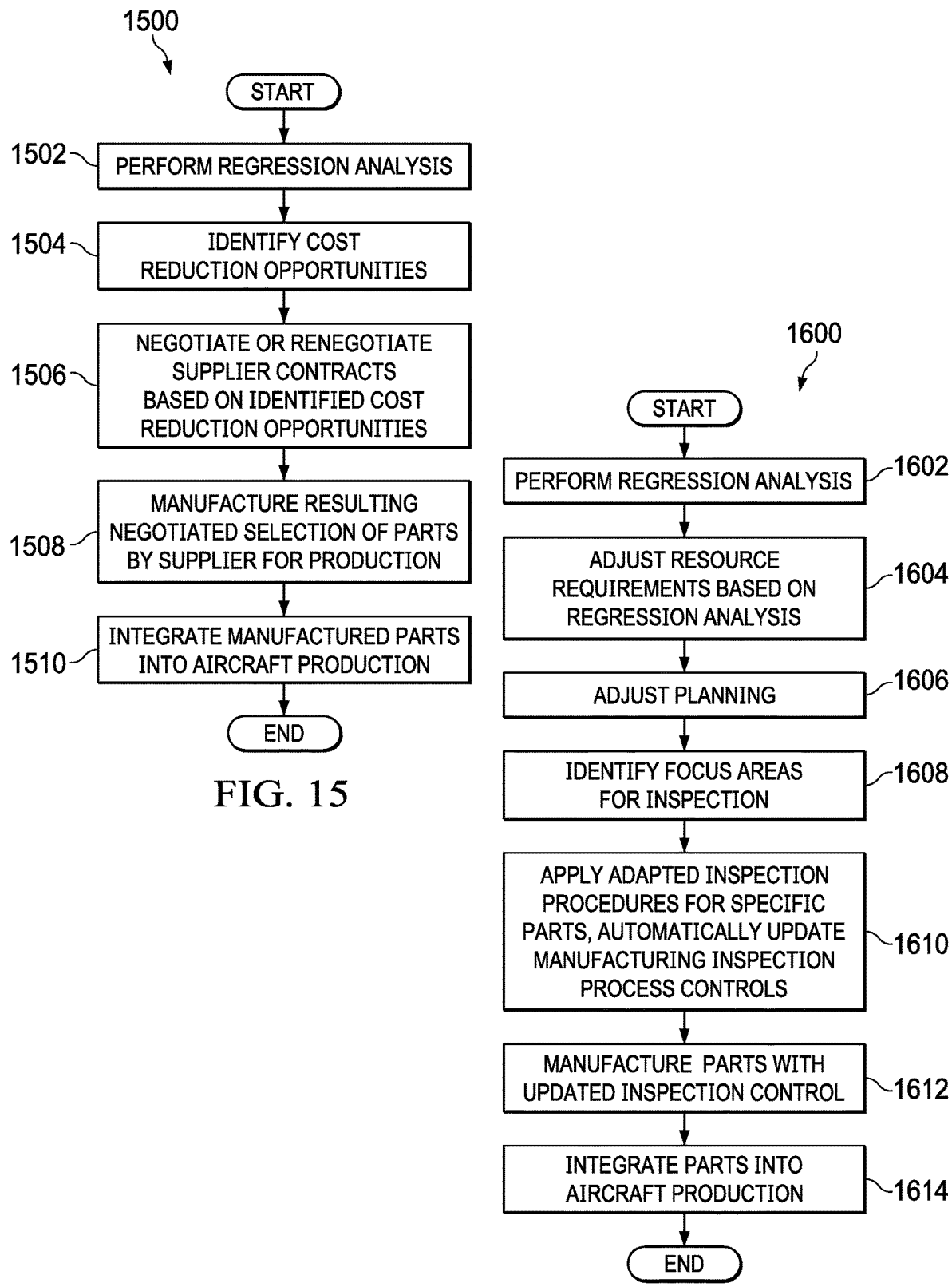

SYSTEM AND METHOD OF VOXEL BASED PARAMETRIC SPECIFICATION FOR MANUFACTURING A PART

BACKGROUND INFORMATION

1. Field

The present disclosure relates generally to the design and manufacture of parts for aircraft and other systems. More particularly, the present disclosure relates to protecting the technical content of shared design rules used in design automation systems.

2. Background

Computer-aided design, CAD, is the use of computer systems to aid in the creation, modification, analysis, or optimization of a design for a product or system or a part of a product or system. CAD software may be used to increase the productivity of a designer, improve the quality of design, improve communications through documentation, and to create a database for manufacturing. For example, CAD may be used to generate a three-dimensional model of a product, system, or part. CAD output may be in the form of electronic files for print, machining, or other manufacturing operations.

Computer-aided manufacturing, CAM, is the use of software to control manufacturing machines and processes in the manufacturing of a product or system or a part of a product or system. CAM software may be used to create a faster production process and components and tooling with more precise dimensions and material consistency. The use of CAM software in some cases may reduce waste in the use of raw materials in manufacturing, while also reducing energy consumption. CAM is a subsequent computer-aided process after CAD, as the model generated in CAD may be input into CAM software, which then controls a manufacturing machine. CAM is used alongside Computer-Aided Design (CAD) to create objects.

A complex system may have very many component parts. For example, an aircraft, such as a commercial passenger aircraft may have millions of parts. Even using CAD and CAM, the design and manufacture of parts for an aircraft or other complex system may be very time consuming. Current CAD/CAM systems or the use thereof thus may have limited efficiency and effectiveness in the design of parts for complex systems.

Therefore, there may be a need for a method and apparatus that take into account at least some of the issues discussed above, as well as other possible issues.

SUMMARY

In one illustrative embodiment, a method of manufacturing a part is provided. A part is designed using a CAD system to generate a CAD part model of the part. Features of the part are identified from the CAD part model of the part. A parametric specification of the part is generated using the features of the part. The parametric specification of the part is saved as a parametric part model. The parametric part model is used to fabricate the part.

Another illustrative embodiment provides an apparatus comprising a CAD system, a parametric part system, and a part fabrication system. The CAD system is configured to generate a CAD part model of the part. The parametric part system is configured to identify features of the part from the CAD part model of the part, to determine a parametric specification of the part using the features of the part, and to store the parametric specification of the part as a parametric part model. The part fabrication system is configured to use the parametric part model to fabricate the part.

Another illustrative embodiment provides a method of manufacturing a part in which a CAD part model of the part is monitored as the part is being designed using a CAD system. An encoded part description for the part is generated as the part is being designed. The encoded part description for the part is compared with encoded part descriptions for parts having already stored designs to identify similar parts. One of the similar parts is identified on a graphical user interface for the CAD system. A selection of one of the similar parts is received as a selected part. A parametric part model for the selected part is used to fabricate the part.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

FIG. 15 is an illustration of a flowchart of a process for pricing of procured parts in accordance with an illustrative embodiment;

FIG. 16 is an illustration of a flowchart of a process for production quality metrics in accordance with an illustrative embodiment;

DETAILED DESCRIPTION

Illustrative embodiments provide a system and method for identifying features of parts from three-dimensional part models generated using a CAD system. Part features are encoded to enable rapid search for parts of interest. Illustrative embodiments provide for the encoding of part features with an emphasis on functional part features. In accordance with one illustrative embodiment, the designing of a part using a CAD system may be monitored and existing parts provided as options to a designer when it is determined that the work-in-progress part design is similar to parts already registered within a parametric part database.

Figure 1:
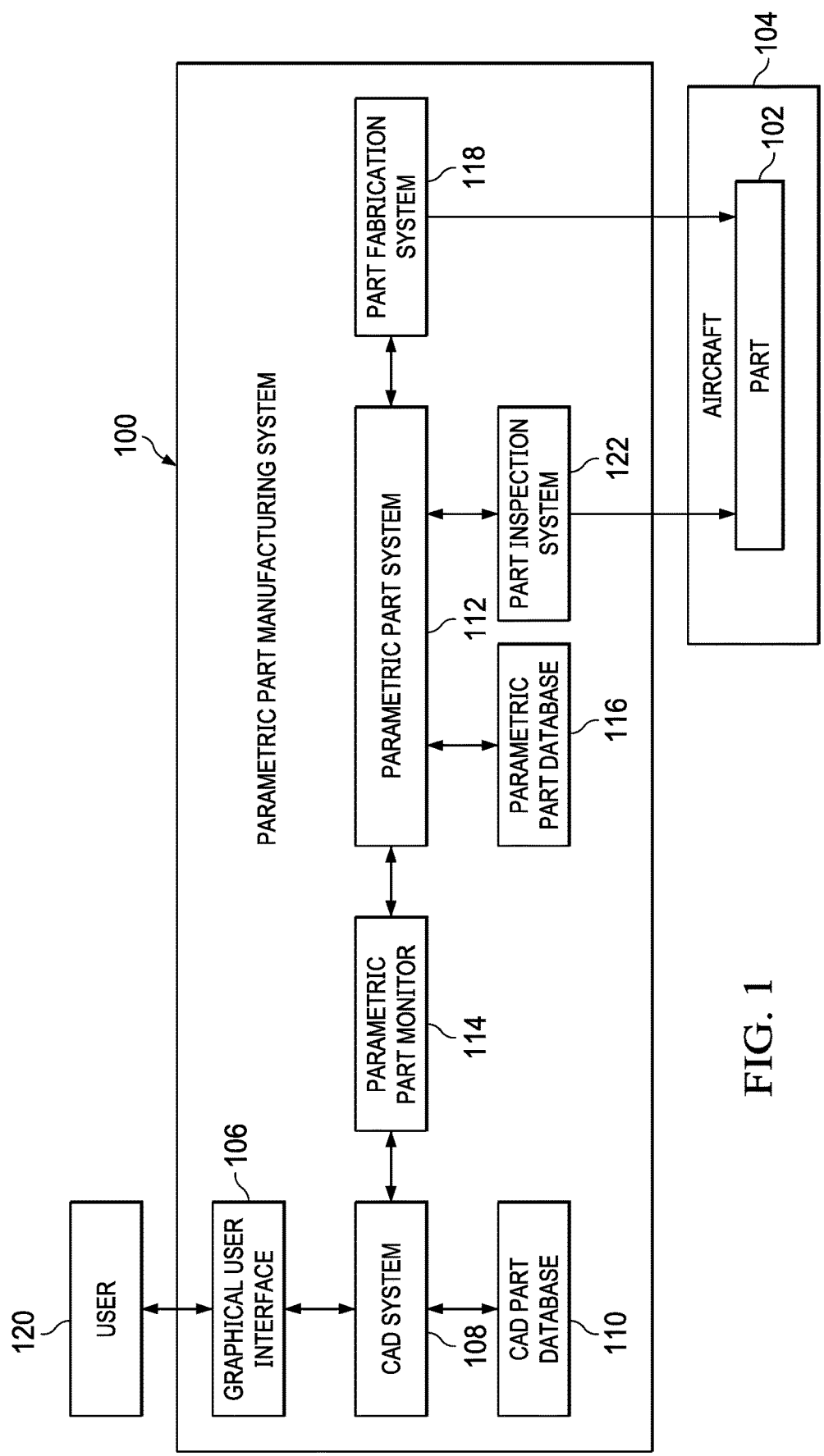
FIG. 1 is an illustration of a block diagram of a parametric part manufacturing system in accordance with an illustrative embodiment.

Turning to FIG. 1, an illustration of a block diagram of a parametric part manufacturing system is depicted in accordance with an illustrative embodiment. Parametric part manufacturing system 100 may be configured to manufacture part 102. For example, without limitation, part 102 may be one of many parts for a complex system, such as aircraft 104.

Parametric part manufacturing system 100 may include graphical user interface 106, CAD system 108, CAD part database 110, parametric part system 112, parametric part monitor 114, parametric part database 116, and part fabrication system 118. Graphical user interface 106 may include any appropriate user display and input devices to allow user 120 to interact with parametric part manufacturing system 100. For example, without limitation, user 120 may be a human designer of part 102.

CAD system 108 may be a computer-aided design system for generating a three-dimensional model of part 102. Beginning with a requirement for part 102, user 120 may use CAD system 108 to design part 102. The design for part 102, generated using CAD system 108 may be stored in CAD part database 110. In accordance with an illustrative embodiment, the use of CAD system 108 to design part 102 may be augmented by parametric part system 112.

Parametric part monitor 114 may be configured to monitor the designing of part 102 using CAD system 108 as features of part 102 are defined incrementally using CAD system 108. Parametric part monitor 114 may monitor the designing of part 102 using CAD system 108 to identify features as they are introduced into the design for part 102.

For example, without limitation, CAD system 108 may be used to generate a three-dimensional geometric model for part 102. The three-dimensional model for part 102 may comprise a spatial volume circumscribed by a plurality of bounding surfaces determined by the surfaces generated by three-dimensional polynomial equations for planes determined by the external surfaces of geometric solids such as spheres, cylinders, rectilinear boxes, and the like. The geometric surfaces may be individually defined by parametric functions or may result from addition and subtraction of a plurality of geometric solids such as spheres, cylinders, rectilinear boxes, and the like.

The features of part 102 may be defined incrementally in CAD system 108 by the addition and subtraction of geometric solids. For example, a drilled hole may be added to the design for part 102 by subtracting a cylinder with the same diameter and length as the drilled hole and from the three-dimensional part model for part 102 at the same geometric location as the drilled hole.

When the CAD design for part 102 is complete, features of part 102 may be identified from the CAD design for part 102 using an extraction sub-system of parametric part system 112. For example, without limitation, such features may include holes, flanges, channels, threads, shanks, other appropriate features, or various combinations of feature common to structural and mechanical parts. Such features of part 102 also, or alternatively, may include geometric shapes such as planes, angles, edges, corners, spherical and cylindrical surfaces, other appropriate geometric shapes, or various combinations of geometric shape features common to structural and mechanical parts. Alternatively, or in addition, features of part 102 may be identified based upon the functional purpose of part 102 and the role of the features in fulfilling the function.

A parametric specification of part 102 may be determined using a parametric part generation sub-system of parametric part system 112. In accordance with an illustrative embodiment, the parametric specification of part 102 may be determined manually, automatically, or in part manually and in part automatically.

For example, without limitation, one feature or location on part 102 may be identified to serve as an origin in three-dimensional coordinates. A type, for example, hole, bend, flange, plane, curve, or the like, may be associated with each identified feature of part 102. One or more measureable attributes and corresponding measured values may be associated with each feature (for example, without limitation, (location=0.0 inch, 1.0 inch, 2.5 inch) or (diameter=0.25 inch)).

Each measurable attribute of a feature may be categorized as fixed or scalable. For example, without limitation, each measurable attribute of a feature may be categorized as fixed or scalable by obtaining input from a design engineer or other appropriate user 120 using graphical user interface 106.

The three-dimensional model of part 102 may be stored in parametric part database 116. Each measure of each feature may be designated as constant or relative. Larger or smaller instances of part 102 may be obtained by scaling the dimensions of the relative measures of each feature by a pre-determined scale factor. For example, without limitation, the pre-determined scale factor may be 0.5×, 2×, 4.25×, or any other appropriate scale factor.

Part fabrication system 118 may be used for the fabrication of part 102 using automated equipment. For example, without limitation, part fabrication system 118 may include a CAM system for controlling automated equipment to manufacture part 102 using the three-dimensional model of part 102 stored in parametric part database 116.

Part fabrication system 118 may be a scalable parametric part fabrication system comprising a parametric part fabrication program. Dimensional coordinates and measures of the parametric part fabrication program may be determined by the dimensional coordinates and measures of the parametric part specification.

The three-dimensional model of part 102 stored in parametric part database 116 may be used by part inspection system 122 to inspect part 102 using automated inspection equipment. For example, part inspection system 122 may be a scalable part inspection system using a scalable parametric part inspection program for controlling automated inspection equipment in part inspection system 122 to inspect part 102 using the three-dimensional model of part 102 stored in parametric part database 116. Dimensional coordinates and measures of the parametric part inspection program may be determined by the dimensional coordinates and measures of the parametric part specification.

An encoded part description of part 102 may be generated using a part encoding subsystem of parametric part system 112. In accordance with an illustrative embodiment, the identified features of part 102 may be used to distinguish between parts and to distinguish between part categories to generate the encoded part description.

The design artifacts of part 102 may be stored in parametric part database 116. For example, without limitation, the design artifacts may include the three-dimensional CAD model of part 102, the part encoding, the parametric specification, the parametric part fabrication program, the parametric part inspection program, and the encoded part description. For example, without limitation, part 102 may be identified as the first member of a part family circumscribed by the parametric part specification.

When designing a new part using CAD system 108, the process of designing the part may be monitored using parametric part monitor 114. Parametric part monitor may be configured to periodically capture a copy of the work-in-progress part design. Parametric part system 112 may then perform the steps described above for part 102.

While a new part is being designed using CAD system 108 and monitored using parametric part monitor 114, the similarity to parts already stored in parametric part database 116 may be determined by comparing the encoded part description of the new part with the encoded part description of the first member of each part family already stored in parametric part database 116. When it is determined that the new part is similar to the first member of one or more families already stored in parametric part database, one part family where the encoded part description of the first member is determined to be most similar to the encoded part description of the new part may be selected. It then may be determined if the new part is sufficiently similar to the first member of the selected part family by comparing the parametric specification of the new part to the parametric specification of the first member of the selected part family. When it is determined that the new part is sufficiently similar to the first member of the selected part family, a suggestion may be presented, through graphical user interface 106, that the designer consider using a part from the selected parametric part family.

If a part from the selected parametric part family is selected, designing of the new part may continue in accordance with the part family parametric specification. The parametric specification of the new part may be converted to be consistent with the parametric specification of the first member of the selected part family by adjusting locations, dimensions, deleting unused features, and the like. A parametric part fabrication program for fabrication of the new part may be converted by adjusting locations, dimensions, deleting unused features, and the like. A parametric part inspection program for inspection of the new part may be converted by adjusting locations, dimensions, deleting unused features, and the like. The three-dimensional model of the new part, the parametric specification, the parametric part fabrication program, the parametric part inspection program, and the encoded part description of the new part may be stored as a member of the selected part family in parametric part database 116.

The parametric specification of a second part may be considered to be similar to the parametric specification of a first part when each key feature of the second part has a counterpart in the first part, the majority of the features in the second part has a counterpart in the first part, and the dimensional measures of feature attributes in the second part do not violate constraints on the dimensional measures of feature attributes in the first part.

The illustration of parametric part manufacturing system 100 in FIG. 1 is not meant to imply physical or architectural limitations to the manner in which illustrative embodiments may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative embodiment.

Figure 2:
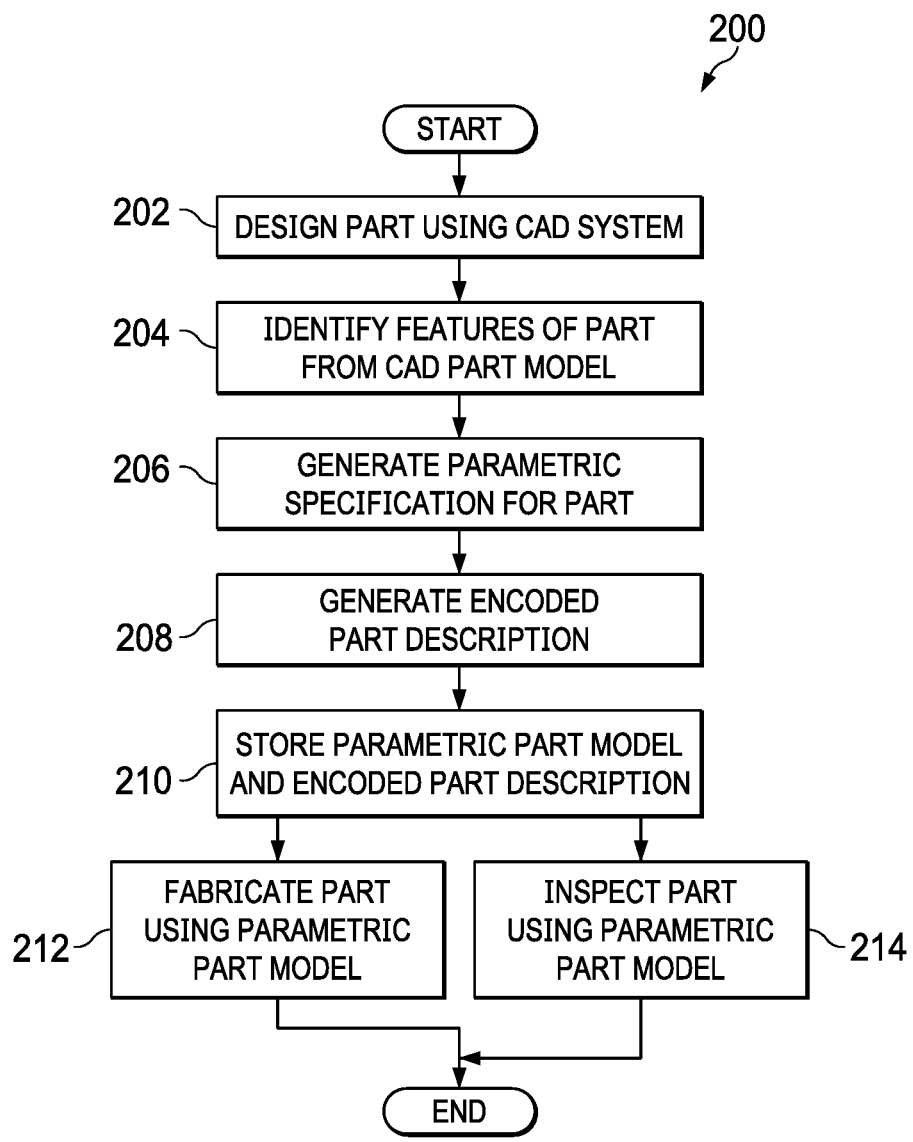
FIG. 2 is an illustration of a flowchart of a process of manufacturing a part in accordance with an illustrative embodiment.

Turning to FIG. 2, an illustration of a flowchart of a process of manufacturing a part is depicted in accordance with an illustrative embodiment. Process 200 may be implemented, for example, in parametric part manufacturing system 100 in FIG. 1.

Process 200 may begin with designing a part using a CAD system (operation 202). Features of the part may be identified from a CAD model of the part generated using the CAD system (operation 204).

For example, without limitation, operation 204 may include identifying geometric features of the part. Geometry feature calculation methods may include algorithms built to measure characteristic descriptors of the geometry which can be used to differentiate the part in terms of the parametric part design applications. The feature calculations may be based off of calculations made on geometric measurements that include surface, volume, curvature, edge angular defects, point angular defects, and topology. Calculated features can include any such feature which is shown to have a statistically significant distinction between association with different part types or part functions.

Multiple geometry features may be captured for the geometry model for each part stored in the database. Primary feature selection may be based on a subject matter expertise human-guided choice of which features drive the highest impact on part design application related qualities and requirements.

Feature downselection or recombination may be included by use of statistical analysis to improve the specific selection of features or formulate recombination of features to use in the subsequent analysis in order to improve the quality of the predictive capability with respect to the selected and constructed inputs. This improvement is designed to meet a single objective or multiple objectives describing different perspectives on capturing the geometric information relevant to predicting application objectives and requirements, and may be used to identify a set of dominating options (a Pareto front) for a final choice of downselected geometry attributes to use.

A parametric specification of the part may be generated (operation 206). An encoded part description for the part may be generated (operation 208).

The part code generation of operation 208 may be implemented using a part code generation algorithm that generates a meaningful, compact coding scheme from a representative group of parts in a data-driven fashion. The input to the algorithm is a potentially large set of parts, each represented by a numeric feature vector describing various geometric, design, process, and other appropriate features. These features might be extracted from CAD models using commercially available tools or from other sources such as metadata stored in one or more auxiliary databases. The code generation algorithm may include the following steps.

First, the correlations between features is computed and highly correlated features are discarded. This may be done by computing the correlation matrix between all pairs of features and then looking at the upper triangle of the matrix and removing features with correlations above some threshold (say, 0.98).

In the next step, a clustering algorithm may be applied to the part feature vectors, utilizing all features that remain after the decorrelation step, to group the parts into a user specified number of part groups, k. Well-known data clustering algorithms, such as K-Means, may be used in this step. The k parameter is specified by the user and may be chosen empirically, by spot checking the quality of the resulting part groups, or by using a priori domain knowledge.

Once the part groups have been formed, each group (or cluster), may be assigned an arbitrary unique ID. The ID of each cluster then may become a class label for each of the parts contained in the cluster.

Next, a supervised feature selection routine may be applied to reduce the set of features to a user-specified number m of features that best describe the dataset. The m parameter directly controls the length of the coding scheme. There are many existing supervised feature selection techniques that may be plugged-in to this step. For example, a random forest-based approach may be used to rank the features by importance and then select the top m features from the ranking to be kept. Intuitively, the feature selection step is seeking to find a smaller subset of features that could be used to derive similar a similar clustering of the parts. The selected features will each represent one dimension, this is, position, of the resulting coding scheme.

Next, for each of the selected features, a supervised discretization algorithm is applied to automatically partition the domain of the feature into a meaningful set of ranges. One such algorithm is the minimum description length principal, MDLP, algorithm, which infers the most appropriate intervals by recursively splitting the domain of each feature to minimize the class-entropy of the parts.

Finally, each of the ranges of a feature is assigned a character from the set {1-9, A-Z}, in order of how they partition the domain. For example, for a feature with a domain of the range [0, 1.0], the discretization algorithm may partition it into the ranges [0, 0.4], [0.4, 0.8], and [0.8, 1.0]. Those distinct ranges may then be represented with the characters "1", "2" and "3" respectively. If more than nine ranges are produced, then alpha characters may be used.

Once the coding scheme has been generated, it is fully specified by the ordered subset of selected features, which represent the dimensions of the code, and the cut points that partition each of those features. Coding a new part involves simply determining for each of those features, in which range the value associated with that part lies and assigning the corresponding character to that position in the code.

The parametric part model generated in operation 206 and the encoded part description generated in operation 208 may then be stored (operation 210). The part may then be fabricated using the parametric part model (operation 212), with the process terminating thereafter. Alternatively, or in addition, the part may be inspected using the parametric part model (operation 214), with the process terminating thereafter.

Figure 3:
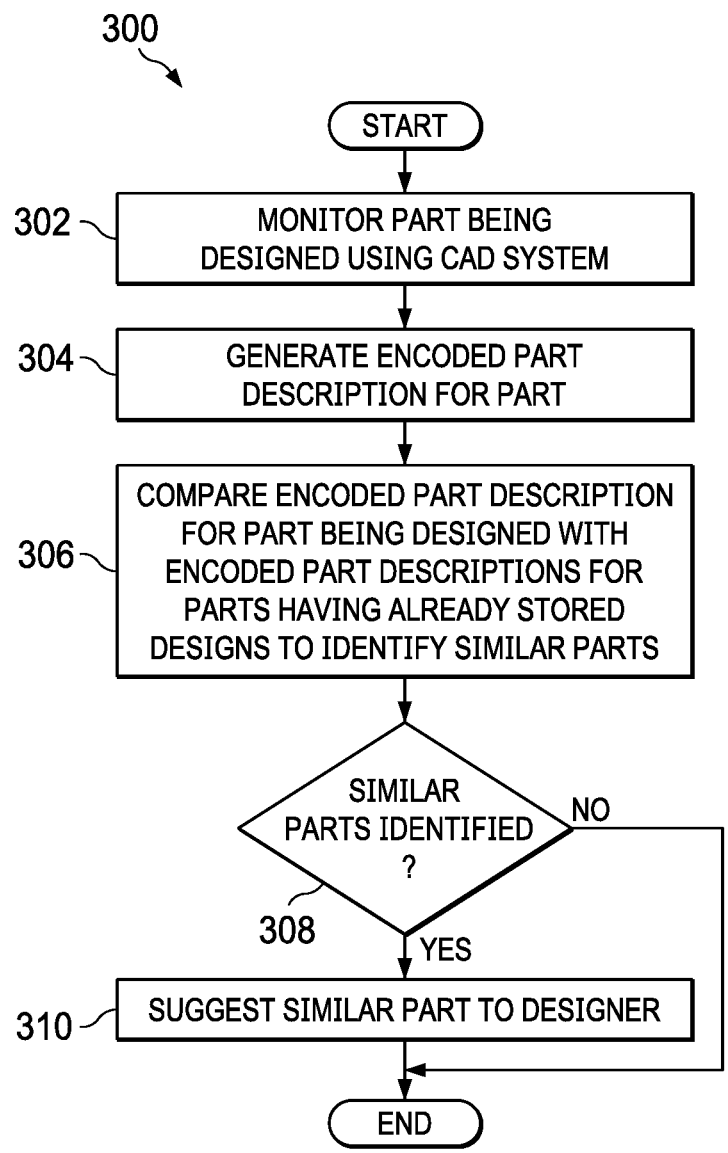
FIG. 3 is an illustration of a flowchart of a process of designing a part in accordance with an illustrative embodiment.

Turning to FIG. 3, an illustration of a flowchart of a process of designing a part is depicted in accordance with an illustrative embodiment. Process 300 may be implemented, for example, in parametric part manufacturing system 100 in FIG. 1.

Process 300 may begin with monitoring a part being designed using a CAD system (operation 302). For example, without limitation, operation 302 may include monitoring a CAD part model of the part as the part is being designed using the CAD system. An encoded part description for the part may be generated as the part is being designed (operation 304). The encoded part description for the part being designed may be compared with encoded part descriptions for parts that have designs that are already stored to identify similar parts (operation 306). It then may be determined whether similar parts are identified (operation 308). In response to a determination at operation 308 that similar parts are identified, the similar parts may be suggested to the user of the CAD system (operation 310), with the process terminating thereafter.

A more detailed description of alternative embodiments will now be described. Although the descriptions presented with respect to FIGS. 4-17 are directed to the manufacturing of aircraft parts, for example, illustrative embodiments are not limited to aircraft parts. Illustrative embodiments may be applied generally to manufacturing parts for any appropriate application.

Figure 4:
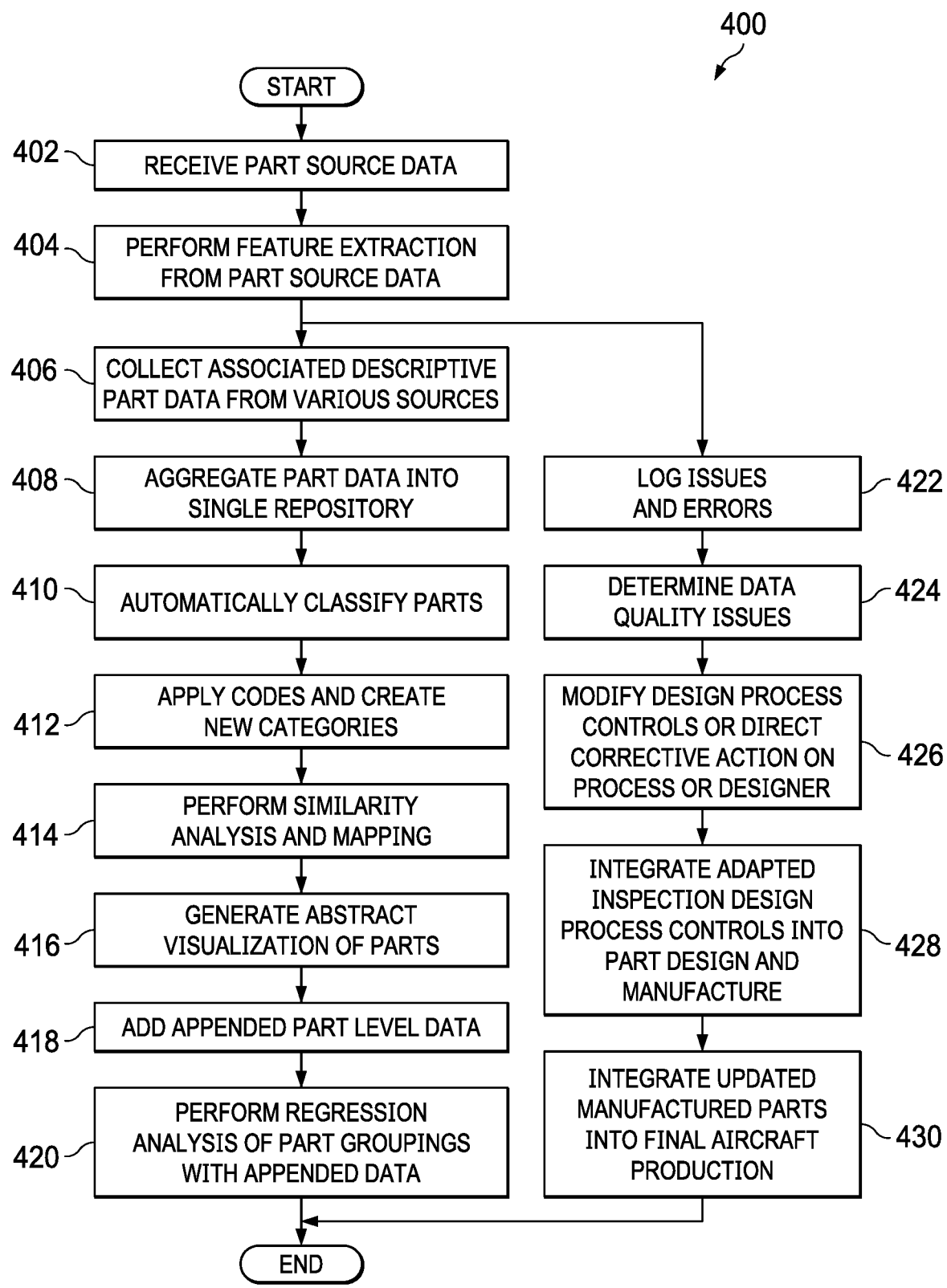
FIG. 4 is an illustration of a flowchart of another process of manufacturing a part in accordance with an illustrative embodiment.

Turning to FIG. 4, an illustration of a flowchart of another process of manufacturing a part is depicted in accordance with an illustrative embodiment. Process 400 is a more detailed example of process 200 in FIG. 2.

Process 400 may begin with receiving part data (operation 402). The part data may be extracted from any appropriate source of part data. For example, without limitation, the part data may be extracted from solid models, part data tables, photographs, two-dimensional drawings, physical parts themselves, or any other appropriate source or combination of sources of part data.

Feature extraction may then be performed on the part data (operation 404). For example, without limitation, feature extraction may include rule-based geometric extraction from solid models. Alternatively, or in addition, feature extraction may include supervised or unsupervised deep learning feature extraction from solid models, text, images, or another appropriate source of part data.

Descriptive part data associated with the part data received in operation 402 then may be collected from various sources (operation 406). The part data then may be aggregated into a single repository (operation 408). For example, without limitation, the part data may be aggregated into a single table.

The parts then may be classified automatically (operation 410). Codes may then be applied to the parts and new categories of parts created if needed or desired (operation 412). A similarity analysis and mapping between parts may then be performed (operation 414). An abstract visualization of the parts may be generated (operation 416). Appended part-level data may be added (operation 418). A regression analysis of part groupings with the appended data then may be performed (operation 420), with the process terminating thereafter.

Returning to operation 404, issues and errors that may occur during feature extraction may be logged (operation 422). Data quality issues associated with the part data received in operation 402 may be determined (operation 424). Design process controls may be modified, corrective action may be directed on the design process or designer, or both based on the issues identified (operation 426). Adapted inspection design process controls may be integrated into part design and manufacture (operation 428). Updated manufactured parts may then be integrated into final aircraft production (operation 430), with the process terminating thereafter.

Figure 5:
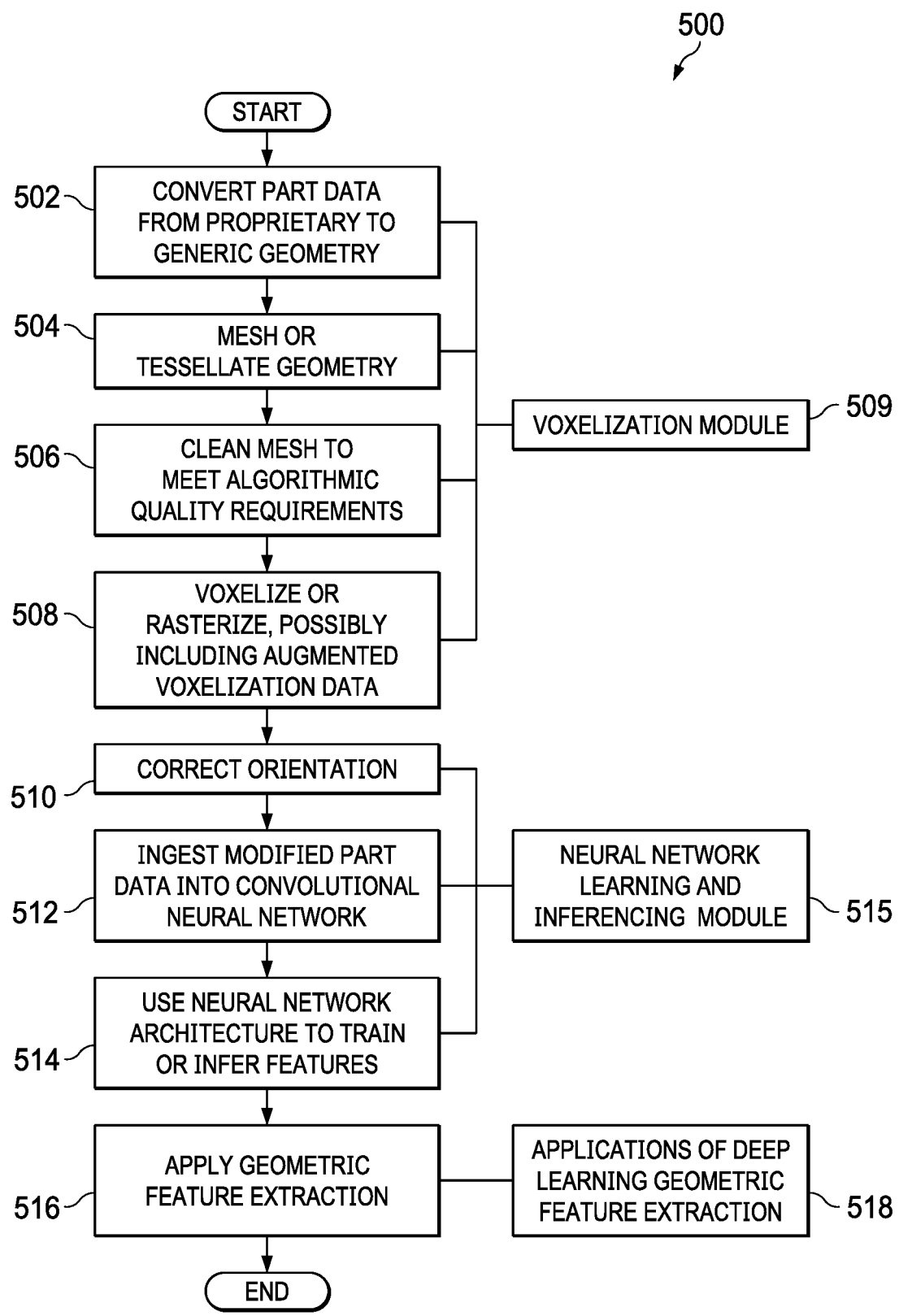
FIG. 5 is an illustration of a flowchart of a process for feature extraction in accordance with an illustrative embodiment.

Turning to FIG. 5, an illustration of a flowchart of a process for feature extraction is depicted in accordance with an illustrative embodiment. Process 500 may be an example of one implementation of operation 402 in FIG. 4.

Process 500 may begin with proprietary to generic geometry conversion of part data (operation 502). The geometry may then be meshed or tessellated (operation 504). The mesh may then be cleaned to meet algorithmic quality requirements (operation 506). Voxelization or rasterizing may then be performed, possibly including augmented voxelization data (operation 508). For example, without limitation, operations 502, 504, 506, and 508 may be performed by voxelization module 509.

Orientation may be corrected (operation 510). The modified part data at this point may be ingested into a convolutional neural network (operation 512). The convolutional neural network architecture may be used to train or infer features (operation 514). For example, without limitation, operations 510, 512, and 514 may be implemented in neural network learning and inferencing module 515.

Geometric feature extraction may then be applied (operation 516), with the process terminating thereafter. Operation 516 may be performed using applications of deep learning geometric feature extraction 518.

Figure 6:
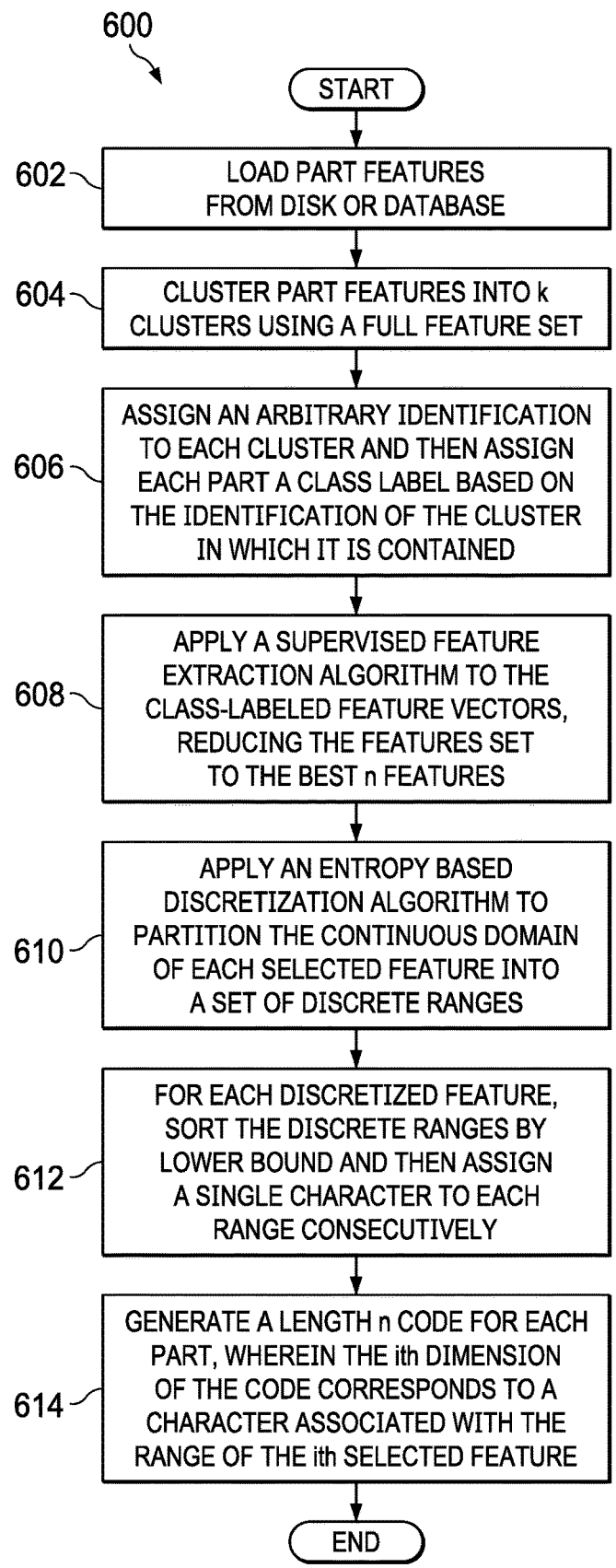
FIG. 6 is an illustration of a flowchart of a process for the automated classification of parts in accordance with an illustrative embodiment.

Turning to FIG. 6, an illustration of a flowchart of a process for the automated classification of parts is depicted in accordance with an illustrative embodiment. Process 600 may be an example of one implementation of operation 410 in FIG. 4.

Process 600 may begin with loading part features from a disk or database (operation 602). Part feature vectors may be clustered into k clusters using a full feature set (operation 604). An arbitrary identification may be assigned to each cluster and then each part may be assigned a class label based on the identification of the cluster in which it is contained (operation 606). A supervised feature extraction algorithm then may be applied to the class-labeled feature vectors, reducing the feature set to the best n features (operation 608).

An entropy-based discretization algorithm then may be applied to partition the continuous domain of each selected feature into a set of discrete ranges (operation 610). For example, without limitation, operation 610 may include applying an entropy-based discretization algorithm to partition the continuous domain of each selected feature into a set of at most 36 discrete ranges or any other appropriate number of discrete ranges. For each discretized feature, the discrete ranges may be sorted by lower bound and then a single character may be assigned to each range consecutively (operation 612). For example, without limitation, operation 612 may include assigning a single character from the set {0-9, A-Z} or from any other appropriate set of characters to each range. A code having a length n then may be generated for each part, wherein the $i^{th}$ dimension of the code corresponds to a character associated with the range of the $i^{th}$ selected feature (operation 614), with the process terminating thereafter.

Figure 7:
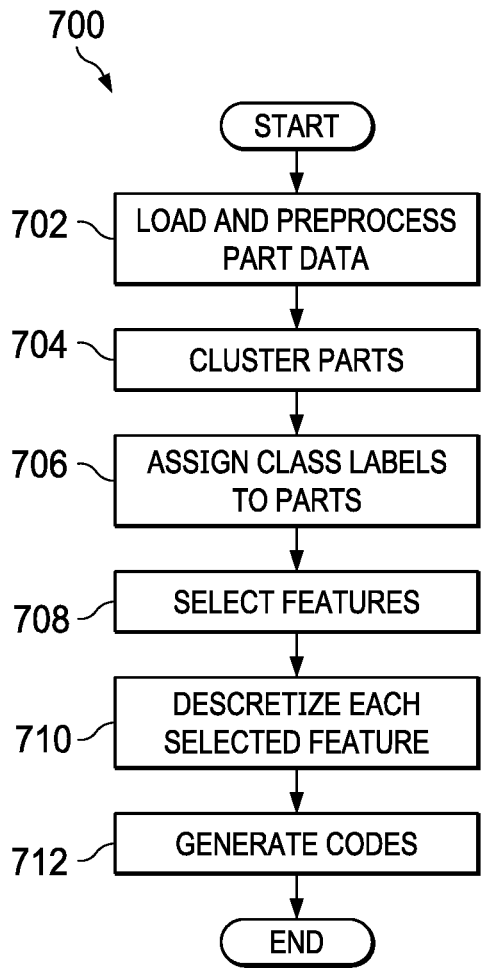
FIG. 7 is an illustration of a flowchart of a process for part taxonomy generation in accordance with an illustrative embodiment.

Turning to FIG. 7, an illustration of a flowchart of a process for part taxonomy generation is depicted in accordance with an illustrative embodiment. Process 700 may be an example of another implementation of operation 410 in FIG. 4.

Process 700 may begin with loading and preprocessing part data (operation 702). Part clustering then may be performed (operation 704). Class labels then may be assigned to the parts (operation 706). Feature selection then may be performed (operation 708), followed by feature discretization (operation 710). Finally, codes for the parts may be generated (operation 712), with the process terminating thereafter.

Figure 8:
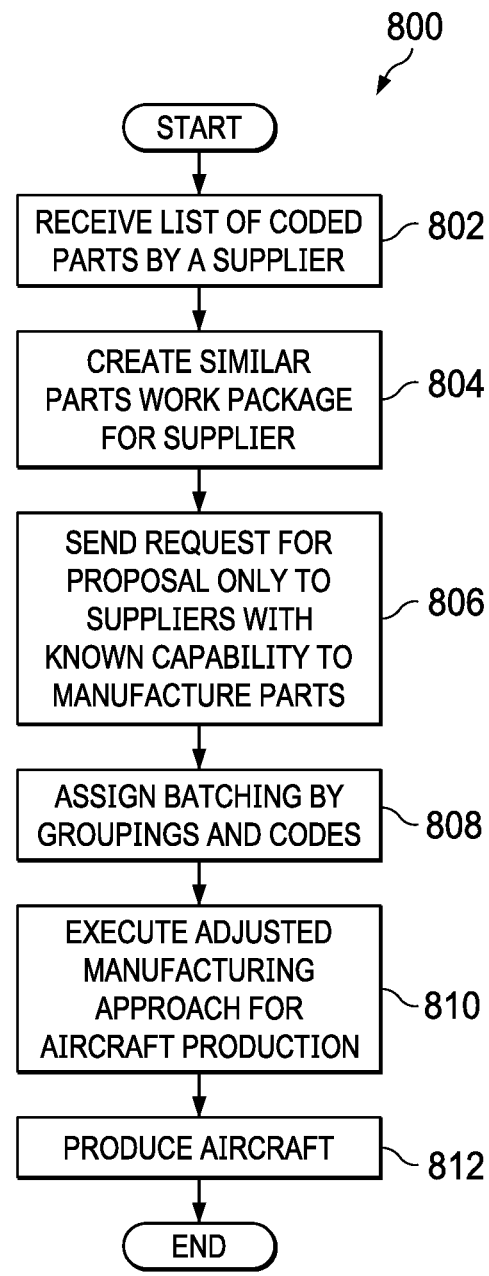
FIG. 8 is an illustration of a flowchart of a process for production resource loading in accordance with an illustrative embodiment.

Turning now to FIG. 8, an illustration of a flowchart of a process for production resource loading is depicted in accordance with an illustrative embodiment. Process 800 may be an example of a process performed as part of operation 412 in FIG. 4.

Process 800 may begin with receiving a list of coded parts by a supplier (operation 802). A similar parts work package for the supplier may be created (operation 804). A request for proposal, RFP, may be sent only to suppliers with known capabilities to manufacture the parts (operation 806). Batching of the parts may be assigned by product groupings and codes (operation 808). An adjusted manufacturing approach for aircraft production may be executed (operation 810) for production of aircraft (operation 812), with the process terminating thereafter.

Figure 9:
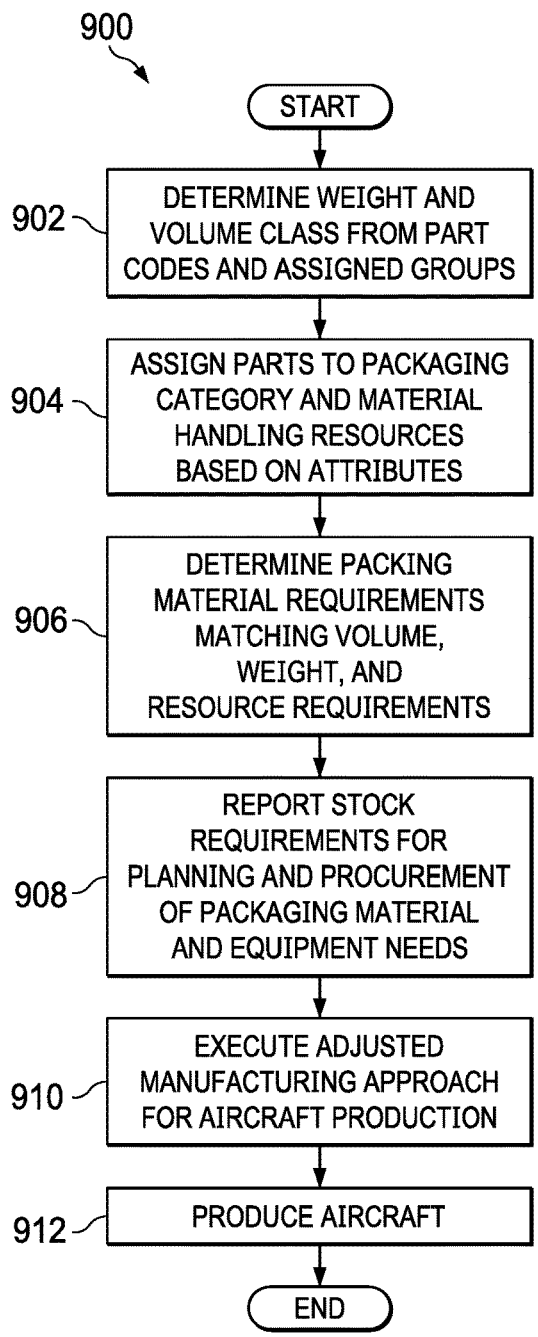
FIG. 9 is an illustration of a flowchart of a process for material handling and packaging in accordance with an illustrative embodiment.

Turning now to FIG. 9, an illustration of a flowchart of a process for material handling and packaging is depicted in accordance with an illustrative embodiment. Process 900 may be an example of a process performed as part of operation 412 in FIG. 4.

Process 900 may begin with determining a weight and volume class from part codes and assigned groups (operation 902). Parts may be assigned to packaging category and material handling resources based on attributes (operation 904). Packing material requirements matching volume, weight, and resource requirements may be determined (operation 906). Stock requirements for planning and procurement of packing materials and equipment needs may be reported (operation 908). An adjusted manufacturing approach for aircraft production may be executed (operation 910) for production of aircraft (operation 912), with the process terminating thereafter.

Figure 10:
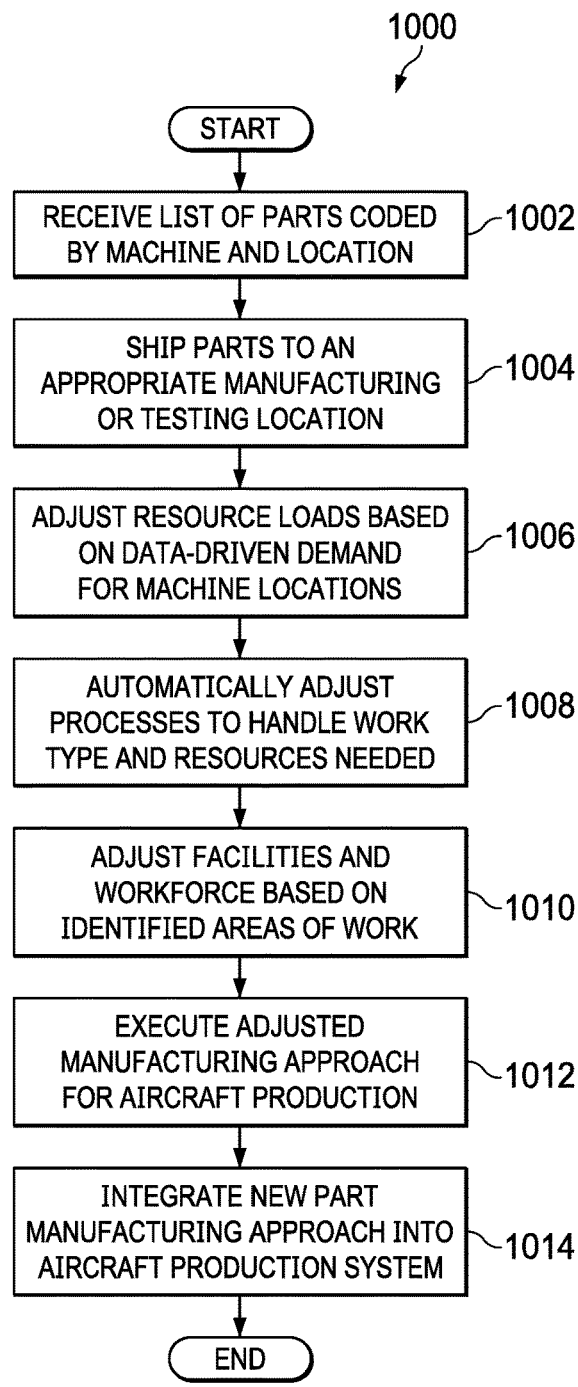
FIG. 10 is an illustration of a flowchart of a process for testing and manufacturing planning in accordance with an illustrative embodiment.

Turning now to FIG. 10, an illustration of a flowchart of a process for testing and manufacturing planning is depicted in accordance with an illustrative embodiment. Process 1000 may be an example of a process performed as part of operation 412 in FIG. 4.

Process 1000 may begin with receiving a list of parts coded by machine and location (operation 1002). The parts may be shipped to an appropriate manufacturing or testing location (operation 1004). Resource loads may be adjusted based on data-driven demand for machine locations (operation 1006). Processes may be automatically adjusted to handle the work type and resources needed (operation 1008). Facilities and the workforce may be adjusted based on the identified areas of work (operation 1010). An adjusted manufacturing approach for aircraft production may be executed (operation 1012) and a new part manufacturing approach integrated into an aircraft production system (operation 1014), with the process terminating thereafter.

Figure 11:
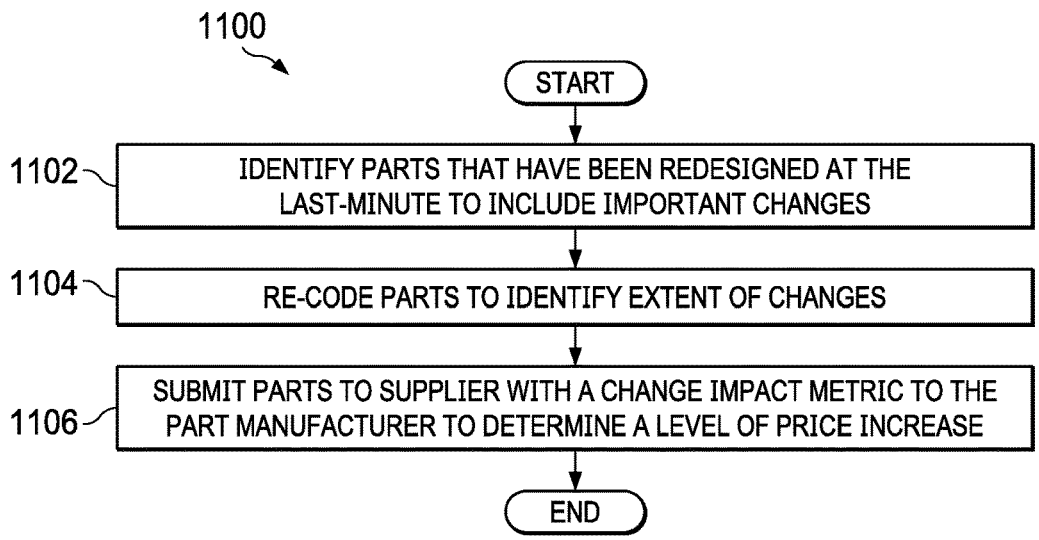
FIG. 11 is an illustration of a flowchart of a process for assertions and price adjustments in accordance with an illustrative embodiment.

Turning now to FIG. 11, an illustration of a flowchart of a process for assertions and price adjustments is depicted in accordance with an illustrative embodiment. Process 1100 may be an example of a process performed as part of operation 412 in FIG. 4.

Process 1100 may begin with identifying parts that have been re-designed at the last-minute to include important changes (operation 1102). Such parts may be re-coded to identify the extent of change (operation 1104). The parts may then be submitted to a supplier with a change impact metric to the part manufacturer to determine a level of price increase (operation 1106), with the process terminating thereafter.

Figure 12:
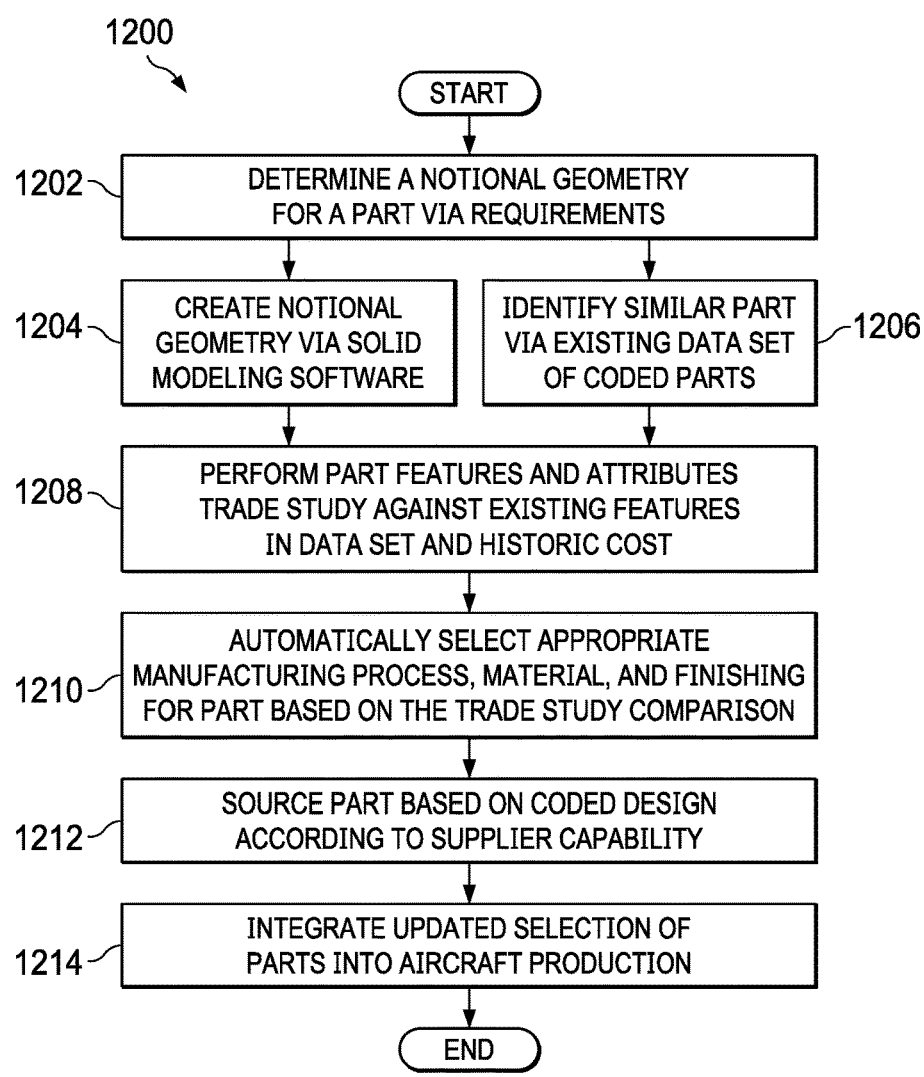
FIG. 12 is an illustration of a flowchart of a process for design engineering in accordance with an illustrative embodiment.

Turning now to FIG. 12, an illustration of a flowchart of a process for design engineering is depicted in accordance with an illustrative embodiment. Process 1200 may be an example of a process performed as part of operation 412 in FIG. 4.

Process 1200 may begin with determining a notional geometry for a part via requirements for the part (operation 1202). The notional geometry may be created using solid modeling software (operation 1204) or a similar part may be identified via a data set of existing coded parts (operation 1206). A part features and attributes trade study may be performed against existing features in the dataset and historic costs (operation 1208). An appropriate manufacturing process, material, and finishing for the part may be selected automatically based on the trade study comparison (operation 1210). The part may then be sourced based on the coded design according to supplier capability (operation 1212). An updated selection of parts may be integrated into aircraft production (operation 1214), with the process terminating thereafter.

Figure 13:
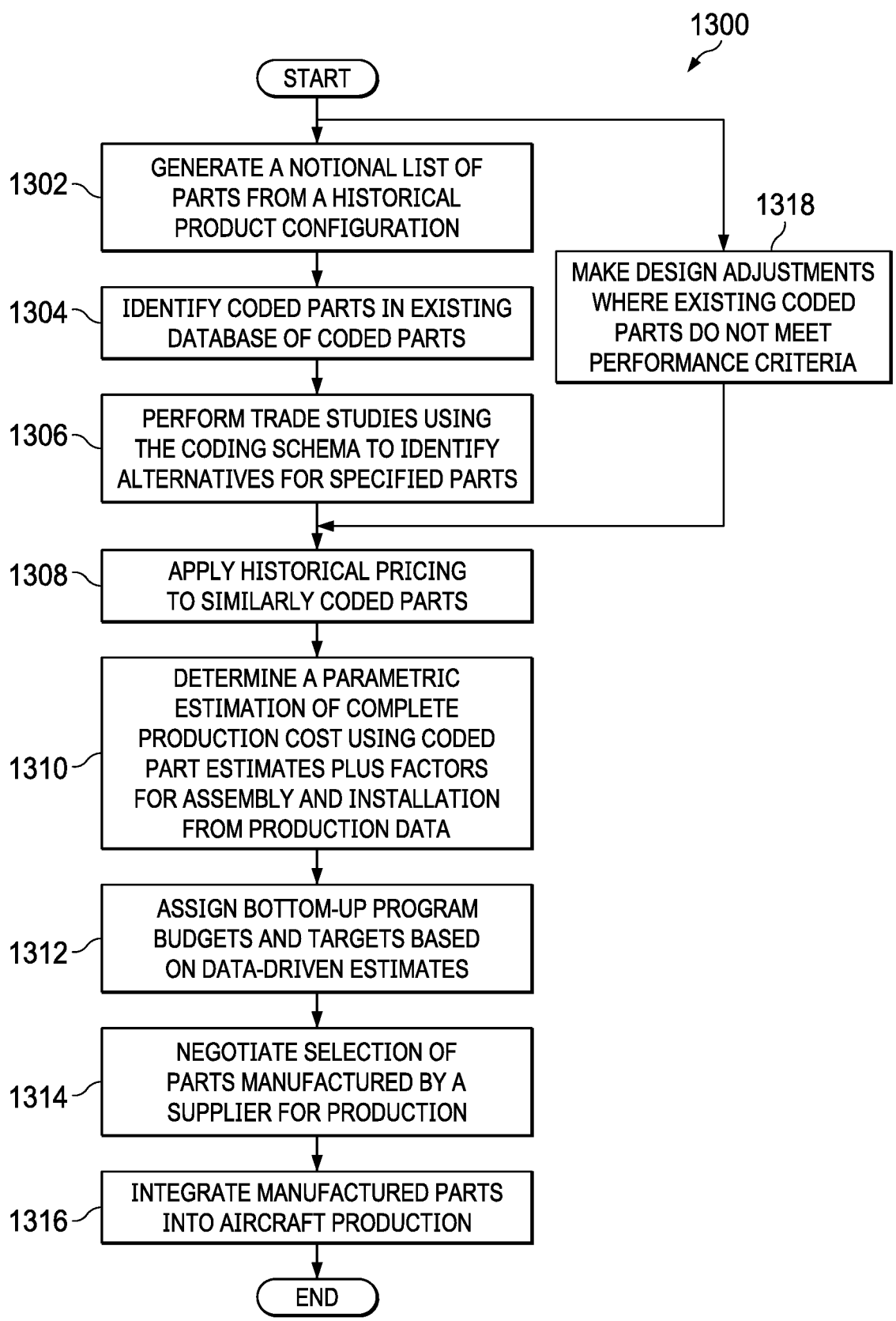
FIG. 13 is an illustration of a flowchart of a process for estimating and forecasting in accordance with an illustrative embodiment.

Turning now to FIG. 13, an illustration of a flowchart of a process for estimating and forecasting is depicted in accordance with an illustrative embodiment. Process 1300 may be an example of a process performed as part of operation 414 in FIG. 4.

Process 1300 may begin with generating a notional list of parts from a historical product configuration (operation 1302). The coded parts are identified in an existing database of encoded parts (operation 1304). Trade studies may be performed using the coding scheme to identify alternatives for specified parts (operation 1306). Historical pricing may be applied to similarly coded parts (operation 1308). A parametric estimation of complete product cost using coded part estimates plus factors for assembly and installation may be determined from production data (operation 1310). Bottom-up program budgets and targets may be assigned based on the data-driven estimates (operation 1312). A selection of parts manufactured by a supplier for production may be negotiated (operation 1314). The manufactured parts may be integrated into aircraft production (operation 1316), with the process terminating thereafter. Returning to operation 1308, operation 1308 and the subsequent operations of process 1300 also may be performed in response to making design adjustments where existing coded parts do not meet performance criteria (operation 1318).

Figure 14:
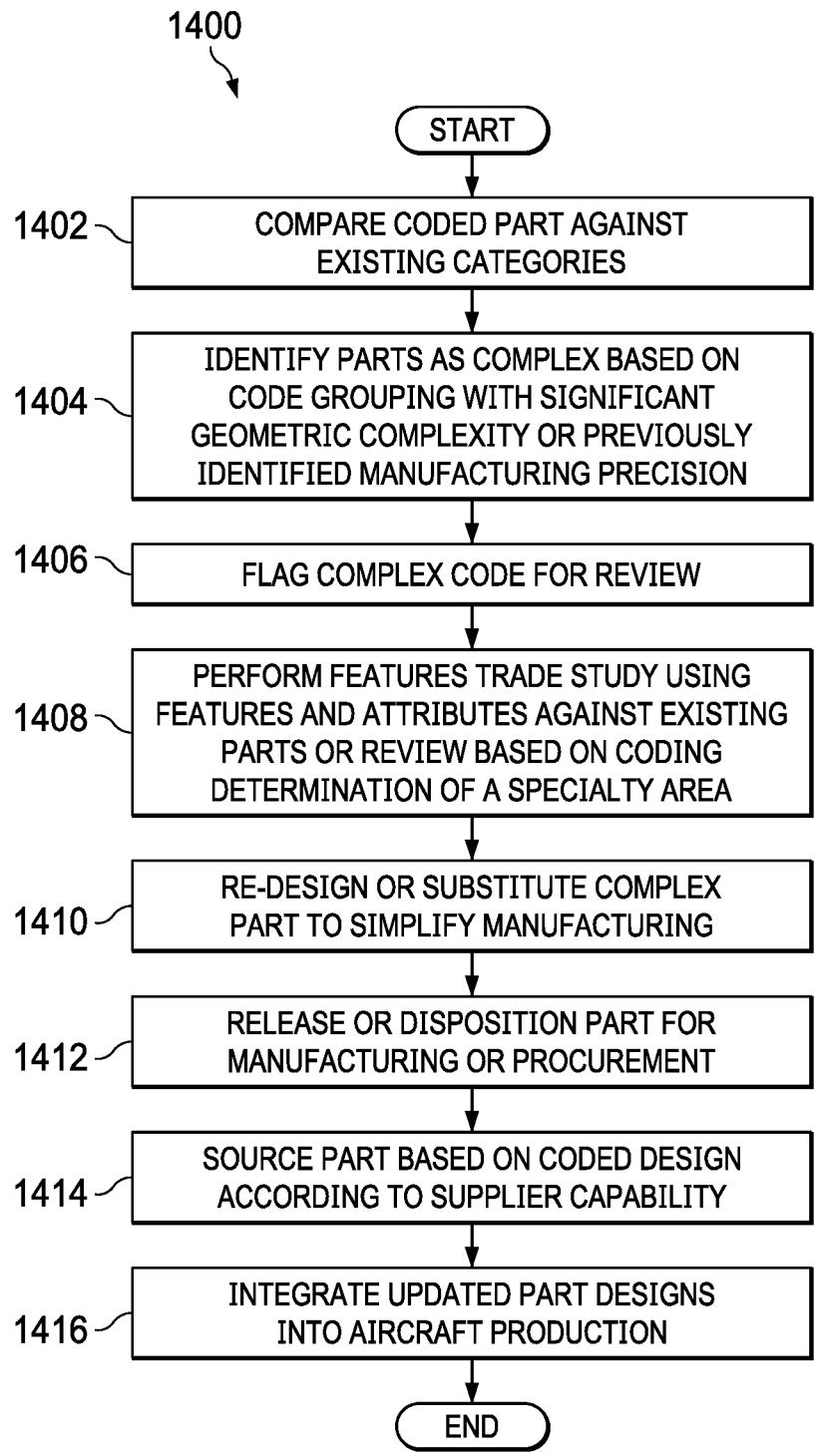
FIG. 14 is an illustration of a flowchart of a process for dealing with design complexity in accordance with an illustrative embodiment.

Turning now to FIG. 14, an illustration of a flowchart of a process for dealing with design complexity is depicted in accordance with an illustrative embodiment. Process 1400 may be an example of a process performed as part of operation 414 in FIG. 4.

Process 1400 may begin with comparing a coded part against existing categories (operation 1402). Parts are identified as complex based on code grouping with significant geometric complexity or previously identified manufacturing precision (operation 1404). A complex code may be flagged for review (operation 1406). A features trade study may be performed using features and attributes against existing parts or review based on coding determination of a specialty area (operation 1408). A part that is flagged as complex may be redesigned or substituted to simplify manufacturing (operation 1410). The part then may be released or dispositioned for manufacturing or procurement (operation 1412). The part may be sourced based on the coded design according to supplier capability (operation 1414). The updated part designs may be integrated into aircraft production (operation 1416), with the process terminating thereafter.

Turning to FIG. 15, an illustration of a flowchart of a process for pricing of procured parts is depicted in accordance with an illustrative embodiment. Process 1500 may be an example of a process performed as part of operation 420 in FIG. 4.

Process 1500 may begin with performing a regression analysis (operation 1502). Cost reduction opportunities may be identified (operation 1504). Contracts for obtaining parts from a supplier may be negotiated or renegotiated based on the cost reduction opportunities identified (operation 1506). The resulting negotiated selection of parts may be manufactured by the supplier for production (operation 1508). The manufactured parts then may be integrated into aircraft production (operation 1510), with the process terminating thereafter.

Turning to FIG. 16, an illustration of a flowchart of a process for production quality metrics is depicted in accordance with an illustrative embodiment. Process 1600 may be an example of a process performed as part of operation 420 in FIG. 4.

Process 1600 may begin with performing a regression analysis (operation 1602). Resource requirements may be adjusted based on the results of the regression analysis (operation 1604). Planning adjustments may be made (operation 1606). Focus areas may be identified for inspection (operation 1608). Adapted inspection procedures may be applied for specific parts and manufacturing inspection process controls automatically updated (operation 1610). The parts may then be manufactured with the updated inspection control (operation 1612). The manufactured parts may then be integrated into aircraft production (operation 1614), with the process terminating thereafter.

Figure 17:
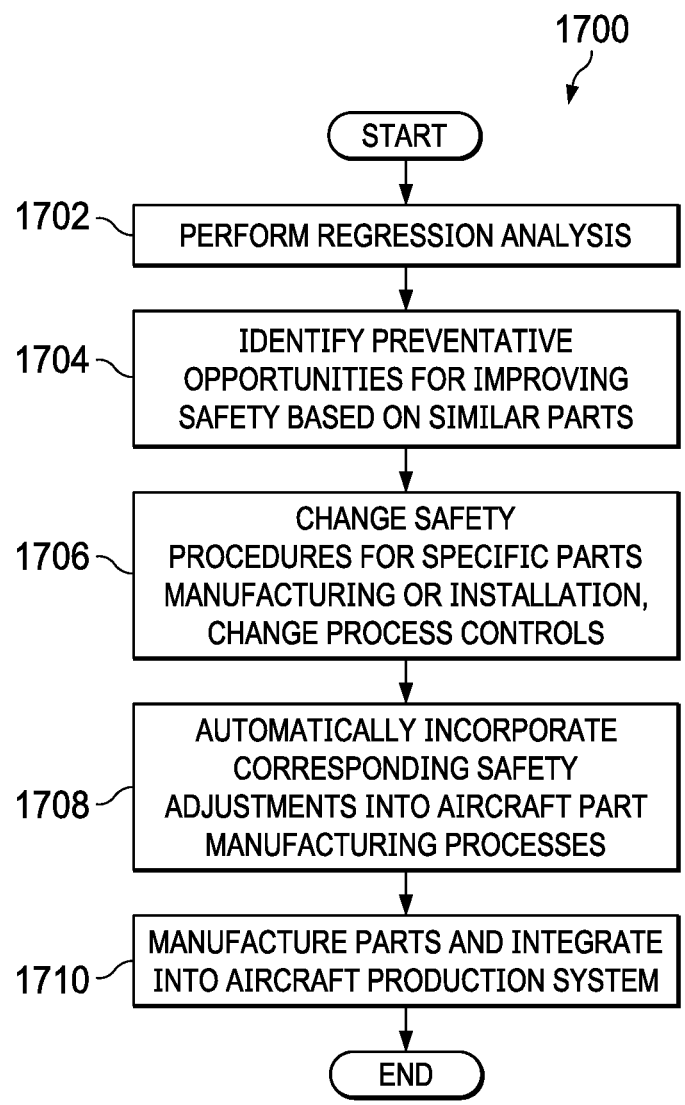
FIG. 17 is an illustration of a flowchart of a process for production safety in accordance with an illustrative embodiment.

Turning to FIG. 17, an illustration of a flowchart of a process for production safety is depicted in accordance with an illustrative embodiment. Process 1700 may be an example of a process performed as part of operation 420 in FIG. 4.

Process 1700 may begin with performing a regression analysis (operation 1702). Preventative opportunities for improving safety may be identified based on similar parts (operation 1704). Based on the identified preventative opportunities, safety procedures for specific parts manufacturing or installation may be changed and process controls may be changed (operation 1706). Aircraft part manufacturing processes may automatically incorporate corresponding safety adjustments (operation 1708). The parts may then be manufactured and integrated into an aircraft production system (operation 1710), with the process terminating thereafter.

Figure 18:
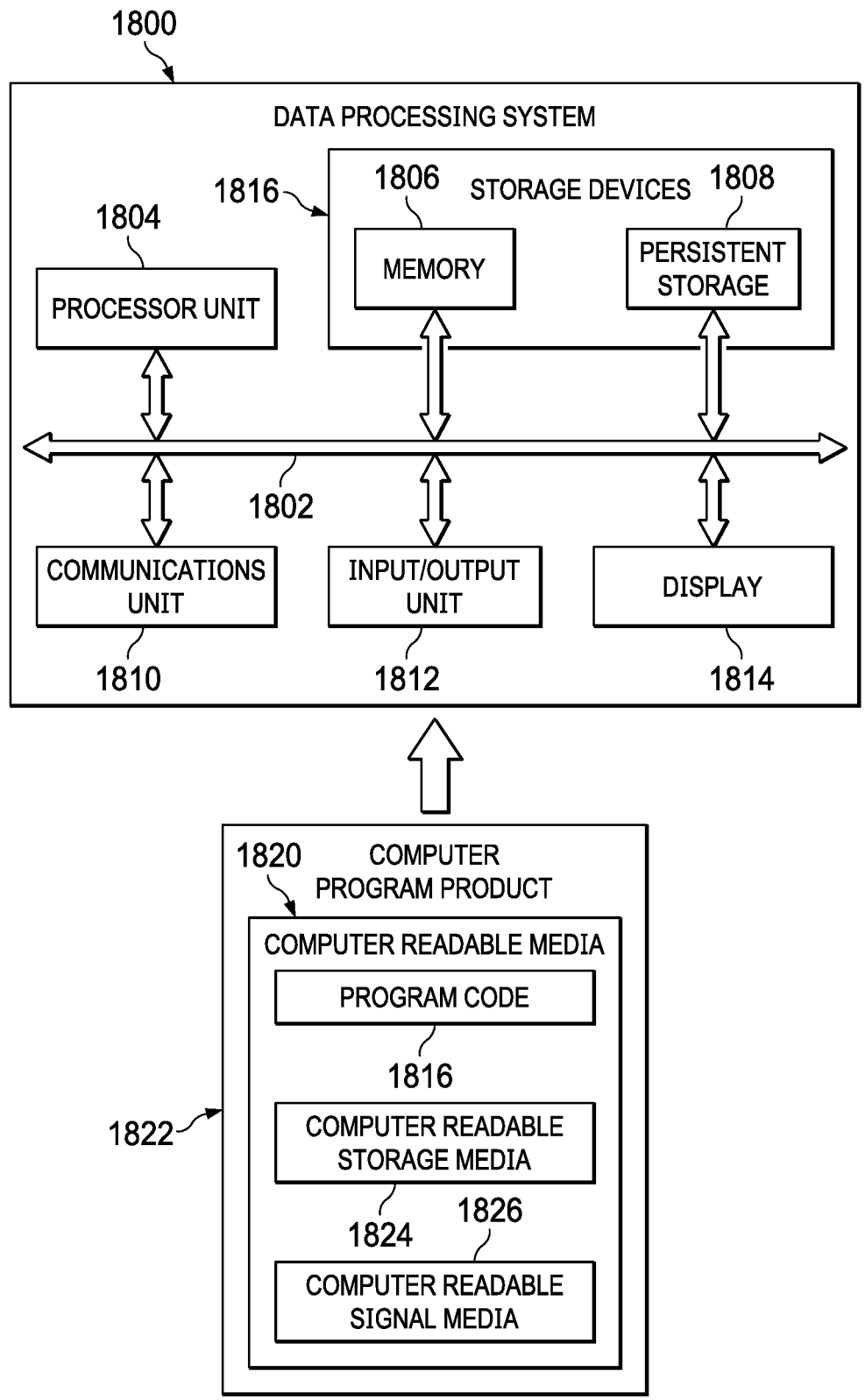
FIG. 18 is an illustration of a block diagram of a data processing system in accordance with an illustrative embodiment.

Turning to FIG. 18, an illustration of a block diagram of a data processing system is depicted in accordance with an illustrative embodiment. Data processing system 1800 is an example of one possible implementation of a data processing system for implementing parametric part manufacturing system 100 in FIG. 1.

In this illustrative example, data processing system 1800 includes communications fabric 1802. Communications fabric 1802 provides communications between processor unit 1804, memory 1806, persistent storage 1808, communications unit 1810, input/output (I/O) unit 1812, and display 1814. Memory 1806, persistent storage 1808, communications unit 1810, input/output (I/O) unit 1812, and display 1814 are examples of resources accessible by processor unit 1804 via communications fabric 1802.

Processor unit 1804 serves to run instructions for software that may be loaded into memory 1806. Processor unit 1804 may be a number of processors, a multi-processor core, or some other type of processor, depending on the particular implementation. Further, processor unit 1804 may be implemented using a number of heterogeneous processor systems in which a main processor is present with secondary processors on a single chip. As another illustrative example, processor unit 1804 may be a symmetric multi-processor system containing multiple processors of the same type.

Memory 1806 and persistent storage 1808 are examples of storage devices 1816. A storage device is any piece of hardware that is capable of storing information, such as, for example, without limitation, data, program code in functional form, and other suitable information either on a temporary basis or a permanent basis. Storage devices 1816 also may be referred to as computer readable storage devices in these examples. Memory 1806, in these examples, may be, for example, a random access memory or any other suitable volatile or non-volatile storage device. Persistent storage 1808 may take various forms, depending on the particular implementation.

For example, persistent storage 1808 may contain one or more components or devices. For example, persistent storage 1808 may be a hard drive, a flash memory, a rewritable optical disk, a rewritable magnetic tape, or some combination of the above. The media used by persistent storage 1808 also may be removable. For example, a removable hard drive may be used for persistent storage 1808.

Communications unit 1810, in these examples, provides for communications with other data processing systems or devices. In these examples, communications unit 1810 is a network interface card. Communications unit 1810 may provide communications through the use of either or both physical and wireless communications links.

Input/output (I/O) unit 1812 allows for input and output of data with other devices that may be connected to data processing system 1800. For example, input/output (I/O) unit 1812 may provide a connection for user input through a keyboard, a mouse, and/or some other suitable input device. Further, input/output (I/O) unit 1812 may send output to a printer. Display 1814 provides a mechanism to display information to a user.

Instructions for the operating system, applications, and/or programs may be located in storage devices 1816, which are in communication with processor unit 1804 through communications fabric 1802. In these illustrative examples, the instructions are in a functional form on persistent storage 1808. These instructions may be loaded into memory 1806 for execution by processor unit 1804. The processes of the different embodiments may be performed by processor unit 1804 using computer-implemented instructions, which may be located in a memory, such as memory 1806.

These instructions are referred to as program instructions, program code, computer usable program code, or computer readable program code that may be read and executed by a processor in processor unit 1804. The program code in the different embodiments may be embodied on different physical or computer readable storage media, such as memory 1806 or persistent storage 1808.

Program code 1818 is located in a functional form on computer readable media 1820 that is selectively removable and may be loaded onto or transferred to data processing system 1800 for execution by processor unit 1804. Program code 1818 and computer readable media 1820 form computer program product 1822 in these examples. In one example, computer readable media 1820 may be computer readable storage media 1824 or computer readable signal media 1826.

Computer readable storage media 1824 may include, for example, an optical or magnetic disk that is inserted or placed into a drive or other device that is part of persistent storage 1808 for transfer onto a storage device, such as a hard drive, that is part of persistent storage 1808. Computer readable storage media 1824 also may take the form of a persistent storage, such as a hard drive, a thumb drive, or a flash memory, that is connected to data processing system 1800. In some instances, computer readable storage media 1824 may not be removable from data processing system 1800.

In these examples, computer readable storage media 1824 is a physical or tangible storage device used to store program code 1818 rather than a medium that propagates or transmits program code 1818. Computer readable storage media 1824 is also referred to as a computer readable tangible storage device or a computer readable physical storage device. In other words, computer readable storage media 1824 is a media that can be touched by a person.

Alternatively, program code 1818 may be transferred to data processing system 1800 using computer readable signal media 1826. Computer readable signal media 1826 may be, for example, a propagated data signal containing program code 1818. For example, computer readable signal media 1826 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1818 may be downloaded over a network to persistent storage 1808 from another device or data processing system through computer readable signal media 1826 for use within data processing system 1800. For instance, program code stored in a computer readable storage medium in a server data processing system may be downloaded over a network from the server to data processing system 1800. The data processing system providing program code 1818 may be a server computer, a client computer, or some other device capable of storing and transmitting program code 1818.

The different components illustrated for data processing system 1800 are not meant to provide architectural limitations to the manner in which different embodiments may be implemented. The different illustrative embodiments may be implemented in a data processing system including components in addition to and/or in place of those illustrated for data processing system 1800. Other components shown in FIG. 18 can be varied from the illustrative examples shown. The different embodiments may be implemented using any hardware device or system capable of running program code. As one example, data processing system 1800 may include organic components integrated with inorganic components and/or may be comprised entirely of organic components excluding a human being. For example, a storage device may be comprised of an organic semiconductor.

In another illustrative example, processor unit 1804 may take the form of a hardware unit that has circuits that are manufactured or configured for a particular use. This type of hardware may perform operations without needing program code to be loaded into a memory from a storage device to be configured to perform the operations.

For example, when processor unit 1804 takes the form of a hardware unit, processor unit 1804 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1818 may be omitted, because the processes for the different embodiments are implemented in a hardware unit.

In still another illustrative example, processor unit 1804 may be implemented using a combination of processors found in computers and hardware units. Processor unit 1804 may have a number of hardware units and a number of processors that are configured to run program code 1818. With this depicted example, some of the processes may be implemented in the number of hardware units, while other processes may be implemented in the number of processors.

In another example, a bus system may be used to implement communications fabric 1802 and may be comprised of one or more buses, such as a system bus or an input/output bus. Of course, the bus system may be implemented using any suitable type of architecture that provides for a transfer of data between different components or devices attached to the bus system.

Additionally, communications unit 1810 may include a number of devices that transmit data, receive data, or both transmit and receive data. Communications unit 1810 may be, for example, a modem or a network adapter, two network adapters, or some combination thereof. Further, a memory may be, for example, memory 1806, or a cache, such as that found in an interface and memory controller hub that may be present in communications fabric 1802.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of manufacturing a part, the method comprising:
   extracting and aggregating into a parametric part database, geometric measurements of: surface, volume, curvature, edge angular defects, point angular defects, and topology, of an existing part or a solid model thereof;
   designing the part using a CAD system for generating a CAD part model of the part comprising categorizing each measurable attribute of each feature of the part as fixed or scalable, designating each measurable attribute of each feature of the part as constant or relative, and comparing the part to the existing part;
   receiving, in a parametric part system, numeric feature vectors for the existing part describing: geometric features, design features, and process features, of the existing part;
   identifying, using a deep learning feature extraction algorithm using voxelization of part data, features of the part from the part data and extracting the features of the part for four or greater dimensions comprising: geometric features, design features, and process features of the part, for feature distinction, such that each dimension of the four or greater dimensions represents a position in a coding scheme representing the part;
   generating an abstract visualization of the part;
   appending part-level data onto the abstract visualization of the part;
   performing a regression analysis of part groupings comprising the part-level data appended onto the abstract visualization of the part;
   downselecting or recombining the features of the part;
   determining a parametric specification of the part and comparing the part to the existing part and using at least one of a result of the downselecting or recombining of the features of the part;
   storing the parametric specification of the part as a parametric part model in the parametric part database;
   adjusting, using results of the regression analysis, resource requirements for production quality metrics, and adapting one of: inspection procedures for the part, manufacturing procedures for the part, or installation procedures for the part;
   and fabricating the part using the parametric part model.

2. The method of claim 1, further comprising identifying geometric shapes in the CAD part model of the part or other testing data representations.

3. The method of claim 1, wherein determining the parametric specification of the part comprises:
   identifying a location on the part to serve as an origin in three-dimensional coordinates;
   associating a type with each feature of the part identified; and
   categorizing each measurable attribute, of each feature of the part identified, as fixed or scalable.

4. The method of claim 1 further comprising:
generating an encoded part description for the part; and
storing the encoded part description for the part.

5. The method of claim 1 further comprising:
monitoring the CAD part model of the part as the part is being designed;
generating an encoded part description for the part as the part is being designed;
identifying similar parts via comparing the encoded part description for the part with encoded part descriptions for parts having already stored designs; and
identifying one of the similar parts on a graphical user interface for the CAD system.

6. The method of claim 1 further comprising inspecting the part using the parametric part model.

7. The method of claim 1, further comprising a voxelization module in the parametric part system ingesting modified part data into a convolutional neural network.

8. An apparatus that comprises:
a CAD system configured to generate a CAD part model of a part that designates each measurable attribute of each feature of the part as constant or relative and compare the part to an existing part;
a parametric part system configured to:
extract and aggregate into a parametric part database, geometric measurements of: surface, volume, curvature, edge angular defects, point angular defects, and topology, of the existing part or a solid model thereof;
receive, in the parametric part system, numeric feature vectors for the existing part that describe: geometric features, design features, and process features, of the existing part;
voxelize part data to identify features of the part from the part data based upon a deep learning feature extraction algorithm;
and extract features of the part for four or greater dimensions comprising; geometric features, design features, and process features, of the part, for distinction of the features of the part from the part data such that each dimension represents a position in a coding scheme that represents the part;
generate an abstract visualization of the part;
append part-level data onto the abstract visualization of the part;
perform a regression analysis of part groupings comprising the part-level data appended onto the abstract visualization of the part;
downselect or recombine the features of the part;
determine a parametric specification of the part based upon a comparison of the part to the existing part and using at least one of a result of the downselecting or recombining of the features of the part;
store the parametric specification of the part as a parametric part model in the parametric part database;
and adjust, based upon results of the regression analysis, resource requirements for production quality metrics, and adapt one of: inspection procedures for the part, manufacturing procedures for the part, or installation procedures for the part;
and a part fabrication system configured to fabricate the part based upon the parametric part model.

9. The apparatus of claim 8, wherein the parametric part system is configured to identify the features of the part by identifying geometric shapes in the CAD part model of the part or data representations comprising data extracted from solid models, part data tables, photographs, two-dimensional drawings, physical parts themselves, or combinations thereof.

10. The apparatus of claim 8, wherein the parametric part system is configured to determine the parametric specification of the part by:
identifying a location on the part to serve as an origin in three-dimensional coordinates;
associating a type with each feature of the part identified;
associating a measurable attribute with each feature of the part identified; and
categorizing each measurable attribute, of each feature of the part identified, as fixed or scalable.

11. The apparatus of claim 8, wherein the parametric part system is further configured to:
generate an encoded part description for the part; and
store the encoded part description for the part.

12. The apparatus of claim 8 further comprising:
a graphical user interface;
a parametric part monitor configured to monitoring the CAD part model of the part as the part is being designed using the CAD system; and
wherein the parametric part system is further configured to:
generate an encoded part description for the part as the part is being designed;
compare the encoded part description for the part with encoded part descriptions for parts having already stored designs to identify similar parts; and
identify one of the similar parts on the graphical user interface.

13. The apparatus of claim 8, further comprising a part inspection system configured to use the parametric part model to inspect the part.

14. The apparatus of claim 8, further comprising a voxelization module in the parametric part system configured to ingest modified part data into a convolutional neural network.

15. A method of manufacturing a part, the method comprising:
extracting and aggregating into a parametric part database, geometric measurements of surface, volume, curvature, edge angular defects, point angular defects, and topology, of an existing part or a solid model thereof;
monitoring a CAD part model of the part as the part is being designed using a CAD system;
categorizing each measurable attribute of each feature of the part as fixed or scalable;
designating each measurable attribute of each feature of the part as constant or relative;
comparing the encoded part description for the part with encoded part descriptions in a parametric database to identify existing parts similar to the part;
receiving, in a parametric part system, numeric feature vectors for the existing part describing: geometric features, design features, and process features, of the existing part;
identifying, using a deep learning feature extraction algorithm using voxelization of part data, features of the part from the part data; and extracting features of the part for four or greater dimensions comprising: geometric features, design features, and process features of the part, for feature distinction from one of the existing parts similar to the part on a graphical user interface for the CAD system, such that each dimension represents a position in a coding scheme representing the part;

generating abstract visualization for the part as the part is being designed;
appending part-level data onto the abstract visualization of the part and forming an encoded part description for the part;
performing a regression analysis of part groupings comprising the part-level data appended onto the abstract visualization of the part;
downselecting or recombining the features of the part using a combinatorial optimization of geometry attributes of the part;
receiving a selection of one of the existing parts similar to the part as a selected part;
adjusting, using results of the regression analysis, resource requirements for production quality metrics, and adapting one of: inspection procedures for the part, manufacturing procedures for the part, or installation procedures for the part; and
fabricating, using a parametric part model for the selected part, the part.

16. The method of claim 15 further comprising using the parametric part model for the selected part to inspect the part.

17. The method of claim 15, further comprising a voxelization module in the parametric part system ingesting modified part data into a convolutional neural network.

18. The method of claim 15 further comprising:
designing the selected part using the CAD system and generating the CAD part model of the selected part;
determining a parametric specification of the selected part using features of the selected part; and
storing the parametric specification of the selected part as the parametric part model.

19. The method of claim 18, wherein identifying the features of the selected part comprises identifying geometric shapes in the CAD part model of the selected part.

20. The method of claim 18, wherein determining the parametric specification of the selected part comprises:
identifying a location on the selected part to serve as an origin in three-dimensional coordinates;
associating a type with each feature of the part identified; and
categorizing each measurable attribute, of each feature of the part identified, as fixed or scalable.

* * * * *